(12) United States Patent
Kitaura

(10) Patent No.: US 6,938,312 B2
(45) Date of Patent: Sep. 6, 2005

(54) WORK PALLET

(75) Inventor: Ichiro Kitaura, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 108 days.

(21) Appl. No.: 10/476,411

(22) PCT Filed: Apr. 17, 2002

(86) PCT No.: PCT/JP02/03847

§ 371 (c)(1), (2), (4) Date: Nov. 18, 2003

(87) PCT Pub. No.: WO02/090043

PCT Pub. Date: Nov. 14, 2002

(65) Prior Publication Data

US 2004/0140604 A1 Jul. 22, 2004

(30) Foreign Application Priority Data

May 8, 2001 (JP) ........................................ 2001-137605

(51) Int. Cl.⁷ .............................. B23P 23/00; B23C 1/14
(52) U.S. Cl. ........................... 29/33 P; 269/63; 269/68; 269/69; 409/198; 409/221; 74/826; 74/813 L
(58) Field of Search ................................ 29/33 P, 563; 483/15; 269/63, 68–71; 409/165–166, 168, 198, 221–225; 74/813 L, 813 C, 813 R, 814, 826

(56) References Cited

U.S. PATENT DOCUMENTS

| | | | | |
|---|---|---|---|---|
| 1,745,460 A | * | 2/1930 | Sudhoff | 409/223 |
| 4,333,363 A | * | 6/1982 | Inaba et al. | 74/826 |
| 4,353,271 A | * | 10/1982 | Pieczulewski | 74/826 |
| 4,502,457 A | * | 3/1985 | Marron | 269/71 |
| 4,644,635 A | * | 2/1987 | Murai et al. | 409/221 |
| 4,726,576 A | * | 2/1988 | Siniko | 409/168 |
| 5,064,044 A | * | 11/1991 | Oketani et al. | 192/141 |
| 5,818,188 A | * | 10/1998 | Hirai et al. | 318/480 |
| 6,619,895 B1 | * | 9/2003 | Durfee, Jr. | 409/221 |

FOREIGN PATENT DOCUMENTS

| | | | |
|---|---|---|---|
| DE | 4034650 A1 | * | 5/1992 |
| FR | 2374136 A | * | 8/1978 |
| GB | 1395912 A | * | 5/1975 |
| JP | 55-90251 A | * | 7/1982 |
| JP | 64-51251 | | 7/1989 |
| JP | 6-179152 A | * | 6/1994 |
| JP | 7-328817 A | * | 12/1995 |
| JP | 8-155768 | | 6/1996 |
| JP | 8-294846 | | 11/1996 |
| JP | 8-300243 | | 11/1996 |

OTHER PUBLICATIONS

Microfilm of the specification and drawings annexed to the request of Japanese Utility Model Appl. No. 90253/1984 (Laid–open No. 5544/1986) (Komatsu Ltd.), Jan. 14, 1986, Claims; Figs. 3,4 (Family: none).

* cited by examiner

Primary Examiner—Erica Cadugan
(74) Attorney, Agent, or Firm—Jordan and Hamburg LLP

(57) ABSTRACT

A work pallet that is arranged to be simple in construction capable of machining five faces of a work by rotating it around the axis of rotation. A work pallet (4) comprises a base body (5) detachably fixed to the table (3) of a machine-tool (1), a pallet main body (6) fixed on the top face of this base body (5), and a work setting face forming body (7), provided on this pallet main body (6) in a way to turn around the rotational axis (20) and having a work setting face (21a) for fixing a work (2), and the pallet main body (6) is provided with a clamping mechanism (31) for releasably fixing the work setting face forming body (7), and a rotational driving mechanism (32) for rotationally driving the work setting face forming body (7) around the rotational axis (20). When machining the work (2), the work setting face forming body (7) can be rotated around the rotational axis (20) by the rotational driving mechanism (32), and the work setting face forming body (7) can be fixed to the pallet body (6) with the clamping mechanism (31) in order to machine five faces of the work (2).

4 Claims, 5 Drawing Sheets

WORK PALLET

TECHNICAL FIELD

The present invention relates to a work pallet, more specifically to a work pallet comprising a base body fixable to the table of a machine-tool, and a work setting face forming body having a work setting face and provided rotatably on the base body.

BACKGROUND ART

Conventionally, a machine-tool such as machining center, etc. is provided with a plurality of work pallets in a pallet magazine, and performs machining of works by transferring and fixing the work pallet to the table of the machine-tool.

It is often the case that a hydraulically driven positioning mechanism and a clamping mechanism are provided on the work pallet, and a hydraulic coupling mechanism for supplying hydraulic pressure in a plurality of lines from the table side to the work pallet is also provided in many cases. Here, the table is rotatable around a vertical axis by its dividing function, and this makes it possible, in the case of a horizontal-type machining center, for example, to perform machining on four faces of the work in the case where the work is fixed on a horizontal plane, and on three faces of the work in the case where the work is fixed on a vertical plane, by rotating the table.

However, to machine the remaining one face other than the fixed faces on the work pallet side, it is necessary to once remove the work from the work pallet, change the orientation of fixing of the work and then fix the work on the work pallet again, and this presents a problem of poor machining efficiency. Under such circumstances, proposal is made of a work pallet comprising a base body to be fixed to the table, and a work setting face forming body, this work setting face forming body being constructed rotatably by electric motor around a horizontal axis.

In the case of a work pallet comprising a base body and a work setting face forming body, wherein the work setting face forming body is driven to turn by electric motor, as described above, it is necessary to feed electric power to the work pallet which is provided with an electric motor, and this not only involves complication of the power feed lines but also requires a complicated control system for controlling the motor to make the work pallet turn at prescribed angle (by 90° each time, for example), presenting a problem of high work pallet manufacturing cost.

The objective of the present invention is to provide a work pallet of simple structure and capable of machining five faces of the work by turning the work around a rotational axis.

DISCLOSURE OF THE INVENTION

The work pallet according to the present invention is a work pallet for detachably fixing a work to be machined with a machine-tool and detachably fixed to the table of a machine-tool, comprising a base body detachably fixed to the table, a pallet main body fixed on a top face of the base body, and a work setting face forming body, provided rotatably around a rotational axis on the pallet main body and having a work setting face for fixing the work; wherein said pallet main body is provided with a hydraulic clamping means for releasably fixing the work setting face forming body, and a hydraulic rotational driving means for rotationally driving the work setting face forming body around said rotational axis.

This work pallet can rotate, in a state detachably fixed to the table of a machine-tool, around a vertical rotational axis by the dividing mechanism of the table of the machine-tool. When machining all of five faces of the work, the work pallet is first turned, in the state in which the work setting face forming body mounting the work is fixed on the pallet main body with the hydraulic clamping means, around a vertical rotational axis by means of the dividing mechanism together with the table, to repeatedly machine the work with the machine-tool, for machining three side faces of the work. Next, the work setting face forming body is made to turn around a rotational axis by means of the hydraulic rotational driving means so that one of remaining faces yet to be machined may be disposed at a position suitable for machining, and the table is turned around the vertical rotational axis to perform machining, and this process is repeated for machining the remaining two faces.

As described above, five faces of the work can be machined without any change in the work mounting position, and this improves the machining efficiency. Moreover, since the work setting face forming body is turned with a hydraulic rotational driving means, the rotational driving mechanism can be simplified in structure. Furthermore, the presence, on the work pallet and the table, of other oil pressure feed lines for fixing the work and for the hydraulic clamping means, makes it possible to construct an oil pressure feed line for the rotational driving means easily in supplementation to those lines.

Hereinafter, various features according to dependent claims will be described. The work setting face in the work setting face forming body may be formed on a vertical plane, so that the shaft portion of the work setting face forming body may be disposed in horizontal posture. When machining all of five faces of the work, it is possible to turn the work setting face forming body by 90°, after machining three faces of the work, around the rotational axis in the vertical plane with the hydraulic rotational driving means so that the remaining faces yet to be machined may be disposed at positions suitable for machining, and turn the table around the vertical rotational axis with the dividing mechanism to perform machining, and repeat this process for machining the remaining two faces of the work.

It is also possible to form the work setting face of the work setting face forming body on a vertical plane or a horizontal plane, and the shaft portion of the work setting face forming body is disposed in a posture inclined by 45° from a horizontal direction in a vertical plane. When machining all of five faces of the work, it is possible to turn the work setting face forming body by 180°, after machining three faces of the work, around the rotational axis inclined by 45° from the horizontal direction with the hydraulic rotational driving means, so that the remaining faces yet to be machined may be disposed at positions suitable for machining, to turn the work setting face by 90° either from vertical plane to horizontal plane or from horizontal plane to vertical plane, and perform machining by turning the table around the vertical rotational axis with the dividing mechanism, and repeat this process for machining the remaining two faces.

The hydraulic rotational driving means may be provided with a pinion fixed to the shaft portion of the work setting face forming body, a rack member engaged with the pinion, and one or more hydraulic cylinders for driving this rack member forward and backward in the longitudinal direction. When turning the work setting face forming body, by moving the rack member forward and backward in the longitudinal direction with the hydraulic cylinder and by turning the pinion engaged with the rack member, the work setting face forming body is turned.

The pallet main body and the work setting face forming body may be provided with a positioning mechanism for positioning the work setting face forming body against the pallet main body. When machining the work, the work setting face forming body can be positioned with the positioning mechanism against the pallet main body with the hydraulic clamping means, and then machining of the work can be performed.

The positioning mechanism may comprises plural positioning pins provided on the pallet main body, and plural arched grooves formed on the work setting face forming body. Plural positioning pins engage with plural arched grooves respectively. As the work setting face forming body is turned in the state where the work setting face forming body is fixed to the pallet main body with the hydraulic clamping means, positioning pins relatively move along the arched grooves while engaging with the arched grooves, and the rotation of the work setting face forming body is blocked, when the positioning pins reached one end of the arched grooves. In the state where the work setting face forming body is fixed to the pallet main body with the hydraulic clamping means, the work setting face forming body can be rotationally driven with the hydraulic rotational driving means.

DETAILED DESCRIPTION OF THE PREFERRED EMBODIMENT

Explanation will be given on a preferred embodiment of the present invention. This preferred embodiment represents an embodiment in which the present invention is applied to a work pallet to be disposed on the table of a machine-tool. The explanation will be made by referring to the front, rear, left, and right in FIG. 1 as such.

Figure 1:
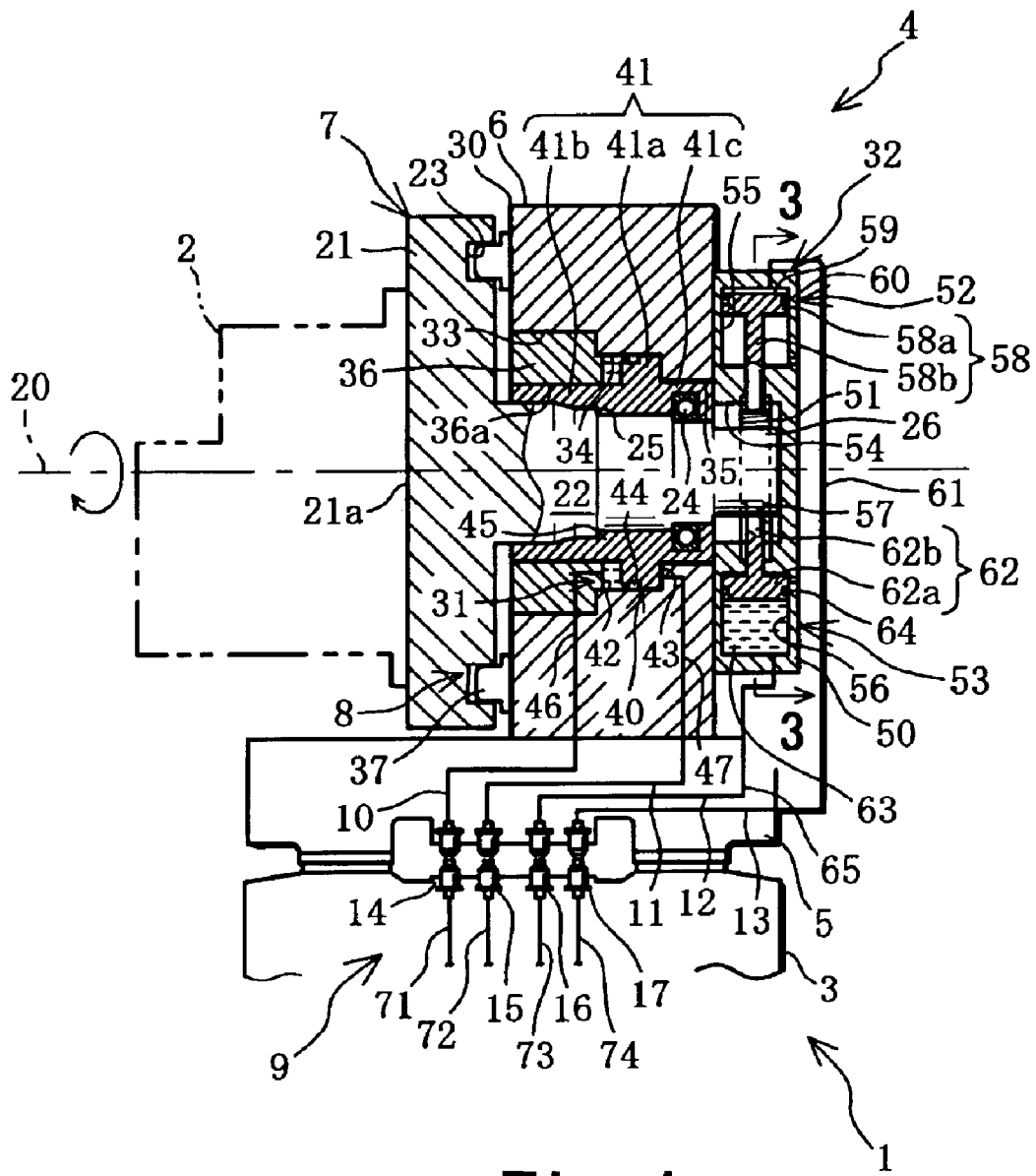
FIG. 1 is a vertically cross sectional view of the work pallet according to a preferred embodiment of the present invention.

As shown in FIG. 1, on a work pallet 4 detachably fixed is a work to be machined with a machine-tool 1. This work pallet 4 is detachably fixed to the table 3 of the machine-tool 1, and the work pallet 4 is rotatable in a horizontal plane with a dividing & positioning mechanism (not illustrated) of the machine-tool 1. The work pallet 4 comprises, a base body 5 to be detachably fixed to the table 3, a pallet main body 6 fixed to the top face of the base body 5, a work setting face forming body 7 provided rotatably around a horizontal rotational axis 20 on this a pallet main body 6 and having a work setting face 21a on which the work 2 is fixed, and a positioning mechanism 8 for positioning the work setting face forming body 7 against the pallet main body 6. Moreover, to this work pallet 4 connected is a hydraulic pressure feed unit 9 for feeding hydraulic pressure to a clamping mechanism 31 and a rotational driving mechanism 32 provided on the pallet main body 6.

The base body 5 has an approximately square shape in plan view, and inside the base body 5 formed are oil passages 10, 11, 12, 13, and those oil passages 10, 11, 12, 13 feed hydraulic pressure to the clamping mechanism 31 and the rotational driving mechanism 32 provided on the pallet main body 6. The oil passages 10, 11, 12, 13 are detachably connected to the hydraulic pressure feed unit 9 through coupling devices 14, 15, 16, 17, respectively.

Figure 2:
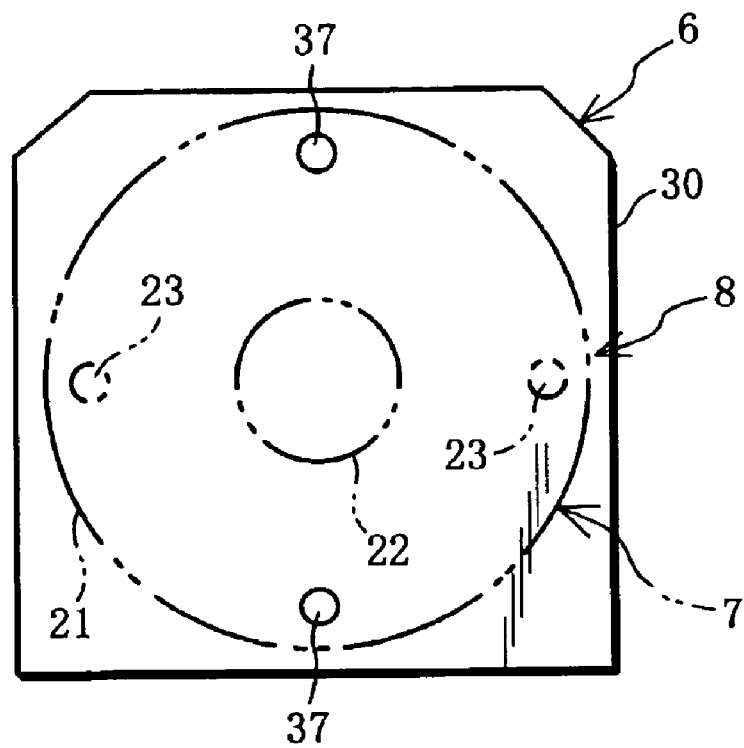
FIG. 2 is a side view of the pallet main body.
Figure 3:
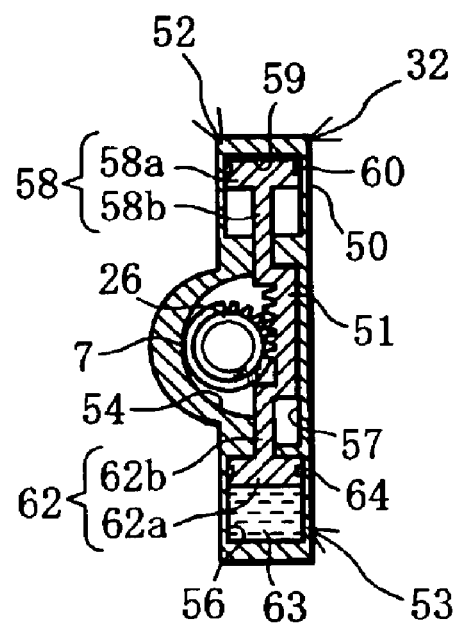
FIG. 3 is a cross sectional view in line III—III in FIG. 1.

As shown in FIG. 1 to FIG. 3, the work setting face forming body 7 comprises a disc-shaped work setting plate 21, and a rotational shaft portion 22 disposed in horizontal posture with extending to the right from the back face of the work setting plate 21 along the rotational axis 20. On the main plane of the work setting plate 21 formed is in vertical plane a work setting face 21a on which the work 2 is fixed. On the right side of the work setting plate 21 formed are pin holes 23 at four positions on a circle. The shaft portion 22 is supported by a bearing 24, and at midway of the shaft portion 22 formed is a ring-shaped stepped portion 25, while at the right end of the shaft portion 22 fixed is a pinion 26 having plural teeth at a portion corresponding to a quarter of the circumference.

As shown in FIG. 1 to FIG. 3, the pallet body 6 comprises a reference body 30, a clamping mechanism 31 (hydraulic clamping means) for releasably fixing the work setting face forming body 7, and a rotational driving mechanism 32 (hydraulic rotational driving means) for rotationally driving the work setting face forming body 7 around the rotational axis 20, etc.

The reference body 30 has an approximately square shape in plan view, and the bottom end of the reference body 30 is fixed to the top face of the base body 5, while at the near portion of the rotational axis 20 the reference body 30 is provided with a large-diameter hole 33, a cylinder hole 34 and a small-diameter hole 35 serially from the left end face. In the large-diameter hole 33 fitted is an annular member 36 for blocking the cylinder hole 34, and the inner circumferential face of the ring-shaped member 36 is formed as a rod insertion hole 36a in which a piston rod 41b of the clamping mechanism 31 is inserted. As shown in FIG. 1 and FIG. 2, at two positions symmetrical to the rotational axis 20, the left end portion of the reference body 30 is provided with two projecting positioning pins 37 engaging with two pin holes 23 respectively.

The clamping mechanism 31 comprises a double acting hydraulic cylinder 40, disposed inside the reference body 30, for generating a clamping force for fixing the work setting face forming body 7 and an unclamping force for releasing it. This hydraulic cylinder 40 is made up of a cylinder hole 34, a piston member 41 in the shape of a cylindrical shaft as output member, a clamping oil chamber 42 for generating clamping force, and an unclamping oil chamber 43 for generating unclamping force, etc.

The piston member 41, fitted on the outside of the shaft portion 22 of the work setting face forming body 7, is made by integrally forming an annular piston 41a, a piston rod 41b extending to the left from the piston 41a, and a cylindrical part 41c extending to the right from the piston 41a.

The piston 41a is slidably fitted in the cylinder hole 34, and the piston 41a is provided with a sealing member 44. On the left side of the piston 41a formed is a clamping oil chamber 42, while on the right side of the piston 41a formed is an unclamping oil chamber 43. The piston rod 41b is slidably inserted in the rod insertion hole 36a, and on the inner circumferential face of the piston rod 41b formed is a engaging portion 45 for transmitting unclamping force to the work setting face forming body 7 by engaging with the stepped portion 25 of the shaft portion 22 of the work setting face forming body 7. The cylindrical portion 41c is slidably fitted in the small-diameter hole 35, and the inner circumferential face of the cylindrical portion 41c is provided with a bearing 24 for supporting the shaft portion 22 of the work setting face forming body 7. Hydraulic pressure can be fed to the clamping oil chamber 42 through the oil passages 10, 46, and hydraulic pressure can be fed also to the unclamping oil chamber 43 through the oil passages 11, 47.

As shown in FIG. 1 and FIG. 3, the rotational driving mechanism 32 is disposed on the right end side of the reference body 30, and this rotational driving mechanism 32 comprises a case body 50, a pinion 26 fixed to the shaft portion 22 of the work setting face forming body 7, a rack member 51 engaging with this pinion 26, and two hydraulic cylinders 52, 53 for driving the rack member 51 to move up and down (forward and backward) in the longitudinal direction of the rack member 51.

On the left end side of the case body 50 formed is a semicircular pinion storing hole 54 for housing the pinion 26, and inside the top end portion and the bottom end portion of the case body 50 formed are cylinder holes 55, 56 of the hydraulic cylinders 52, 53 respectively, and also formed is a rack storing hole 57 leading to the cylinder holes 55, 56.

As shown in FIG. 3, the pinion 26 is provided with a plurality of teeth at a quarter portion of the outer circumference so that the work setting face forming body 7 may turn by 90°, and the pinion 26 is housed in the pinion storing hole 54 so as to rotate by 90°. Both ends of rack member 51 are integrally connected with the tips of the piston members 58, 62 of the two hydraulic cylinders 52, 53 respectively, and the rack member 51 is housed in the rack storing hole 57 so as to freely slide up and down, while on the pinion side (left side in FIG. 3) of the rack member 51 formed are a plurality of teeth, engageable with the pinion 26.

The hydraulic cylinder 52 is provided with a cylinder hole 55, a piston member 58 as output member, an oil chamber 59 for driving the piston member 58 downward. The piston member 58 is made by integrally forming a piston 58a and a piston rod 58b, and the piston 58a is slidably fitted in the cylinder hole 55, and the piston 58a is provided with a sealing member 60. On the upper side of the piston 58a formed is an oil chamber 59, and hydraulic pressure can be fed to this oil chamber 59 through a hydraulic hose 61 and oil passage 13. The bottom end of the piston rod 58b is integrally connected with the top end of the rack member 51.

Similarly, the hydraulic cylinder 53 is also provided with a cylinder hole 56, a piston member 62 as output member, an oil chamber 63 for driving this piston member 62 upward. The piston member 62 is made by integrally forming a piston 62a and a piston rod 62b, and the piston 62a is slidably fitted in the cylinder hole 56, while the piston 62a is provided with a sealing member 64. On the lower side of the piston 62a formed is an oil chamber 63, and hydraulic pressure can be fed to this oil chamber 63 through a hydraulic hose 65 and oil passage 12. The top end of the piston rod 62b is integrally connected with the bottom end of the rack member 51.

When turning the work setting face forming body 7 clockwise (direction of arrow mark in FIG. 1) with the rotational driving mechanism 32, hydraulic pressure is fed to the oil chamber 63 to drive the piston member 62 upward, in the state in which hydraulic pressure is relieved from the oil chamber 59, and thus the rack member 51 is driven to move upward and the pinion 26 engaged with the rack member 51 turns clockwise by 90°, and the work setting face forming body 7 is driven to turn clockwise by 90°. When turning the work setting face forming body 7 counterclockwise (direction opposite to the direction of arrow mark in FIG. 1), hydraulic pressure is fed to the oil chamber 59 to drive the piston member 58 downward, in the state in which hydraulic pressure is relieved from the oil chamber 63, and thus the rack member 51 is driven to move downward and the pinion 26 engaged with the rack member 51 turns counterclockwise by 90°, and the work setting face forming body 7 is driven to turn counterclockwise by 90°.

The positioning mechanism 8, comprising of a positioning pin 37 on the pallet body 6 and a pin hole 23 in the work setting face forming body 7, positions the work setting face forming body 7 against the pallet main body 6 by engaging the positioning pin 37 with the pin hole 23, when fastening the work setting face forming body 7 to the pallet main body 6 with the clamping mechanism 31, after fitting the pin hole 23 to the position of the positioning pin 37 by turning the work setting face forming body 7 with the rotational driving mechanism 32.

Figure 4:
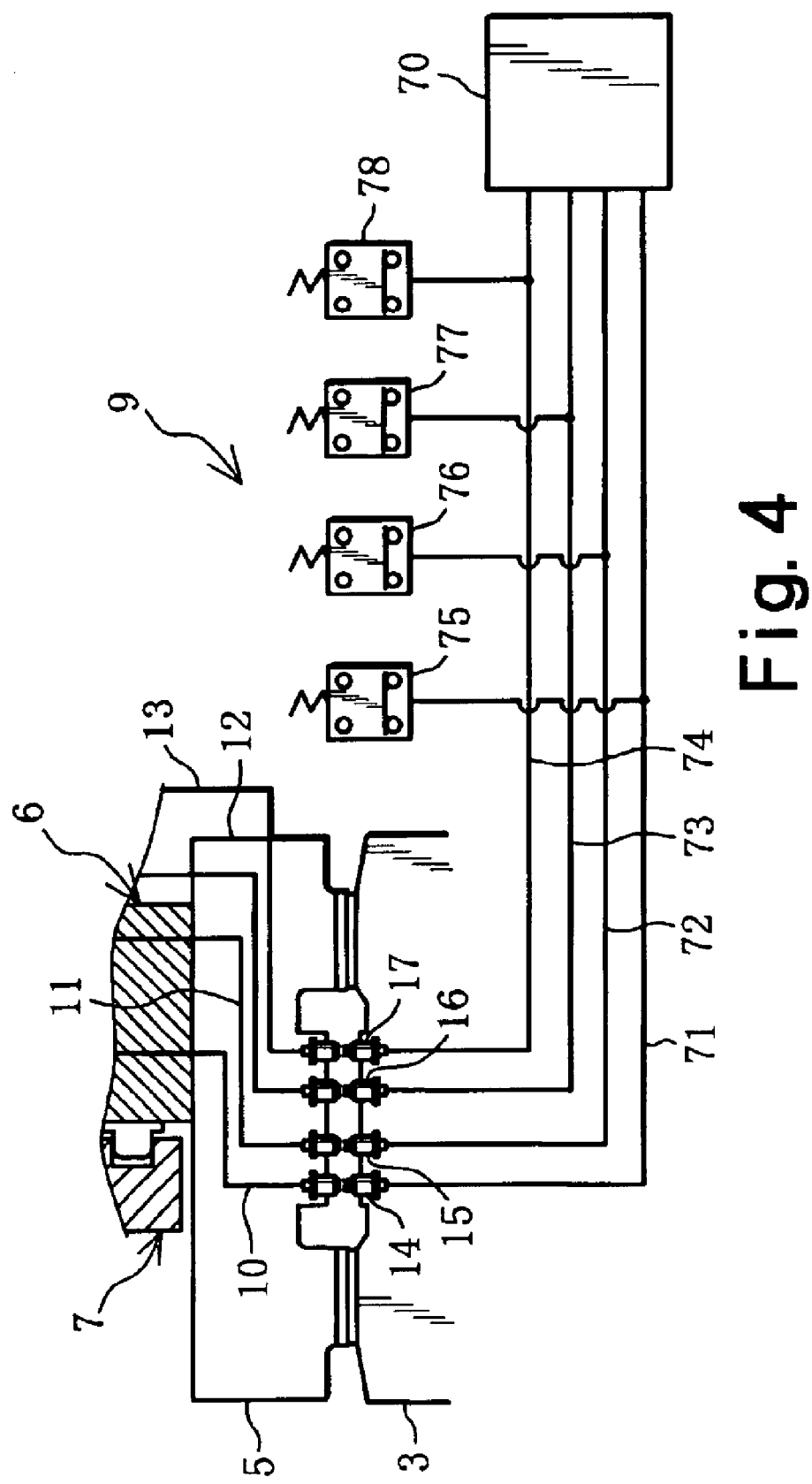
FIG. 4 is a diagram of the hydraulic feed unit.

As shown in FIG. 4, the hydraulic pressure feed unit 9 comprises a hydraulic pressure supplying source 70 having a hydraulic pump, an accumulator, and a selector valve, and oil passages 71, 72, 73, 74 for connecting this hydraulic pressure supplying source 70 with the respective oil passages 10, 11, 12, 13 through coupling devices 14, 15, 16, 17. Oil passages 71, 72, 73, 74 are provided with pressure switches 75, 76, 77, 78 respectively, and any pressure increase in the respective oil passages 71, 72, 73, 74 is detected with the pressure switches 75, 76, 77, 78 to check fixing and releasing of the work setting face forming body 7 by the clamping mechanism 31, and completion of clockwise and counterclockwise rotation of the work setting face forming body 7 with the rotational driving mechanism 32.

Next, explanation will be given on operation of the work pallet 4.

As shown in FIG. 1, as hydraulic pressure is fed to the clamping oil chamber 42, in the state in which the work 2 is fixed on the work setting face 21a and the positioning pin 37 of the positioning mechanism 8 is at a position engageable with the pin hole 23, the piston member 41 is driven to move to the right and, as a result, the work setting face forming body 7 is also driven to move to the right, and the positioning pin 37 engages with the pin hole 23 to position and fix the work setting face forming body 7 to the pallet main body 6. When the right end face of the piston 41a abuts the right end of the cylinder hole 34, the oil pressure in the oil passages 46, 10, 71 will rise, and this pressure increase can be detected with the pressure switch 75 to verify fixing of the work setting face forming body 7. In this state, three faces of the work 2 can be machined, by turning the work pallet 4 in the horizontal plane, by the dividing mechanism of the machine-tool.

Next, when performing machining on other two faces of the work which cannot be machined in above state, relieve the hydraulic pressure from the clamping oil chamber 42, and then feed hydraulic pressure to the unclamping oil chamber 43, and the piston member 41 is driven to move to the left and, as a result, the work setting face forming body 7 is also driven to move to the left, and the work setting face forming body 7 is released. When the left end face of the piston 41a abuts the left end of the cylinder hole 34, the oil pressure in the oil passages 47, 11, 72 will rise, and this pressure increase can be detected with a pressure switch 76 to verify releasing of the work setting face forming body 7.

When the fixing of the work setting face forming body 7 is released, the. engagement of the positioning pin 37 with the pin hole 23 is also released. Therefore, if hydraulic pressure is fed to the oil chamber 63, in the state in which hydraulic pressure is relieved from the oil chamber 59, the rack member 51 is driven to move upward and the pinion 26 engaged with the rack member 51 turns clockwise by 90°, and the work setting face forming body 7 is driven to turn clockwise by 90°. At that time, in the case where the piston 62a of the hydraulic cylinder 53 abuts the top end of the cylinder hole 56, the oil pressure in the oil passages 12, 73 will rise, and the operator can check completion of the clockwise rotation of the work setting face forming body 7 by detecting this pressure increase with the pressure switch 77.

Similarly, if hydraulic pressure is fed to the oil chamber 59, in the state in which hydraulic pressure is relieved from the oil chamber 63, the rack member 51 is driven to move downward and the pinion 26 engaged with the rack member 51 turns counterclockwise by 90°, and the work setting face forming body 7 is driven to turn counterclockwise by 90°. At that time, in the case where the piston 58a of the hydraulic cylinder 52 abuts the bottom end of the cylinder hole 55, the oil pressure in the oil passages 13, 74 will rise, and the operator can check completion of the counterclockwise rotation of the work setting face forming body 7 by detecting this pressure increase with the pressure switch 78.

As described above, after the work setting face forming body 7 is driven to turn by 90° either clockwise or counterclockwise, the clamping mechanism 31 fixes the work setting face forming body 7 to the pallet main body 6, while the positioning mechanism 8 positions the work setting face forming body 7 to the pallet main body 6, to perform machining on the remaining two faces of the work 2.

According to the work pallet 4 described above, the work setting face forming body 7, having the work setting face 21a on which the work 2 is fixed, can be turned by 90° in a vertical plane, and this makes it possible to machine five faces of the work 2 without changing the mounting state or direction of the work 2, and thus improve the machining efficiency. Moreover, the rotational driving mechanism 32 drives the rack member 51 to move up and down by the hydraulic cylinders 52, 53 and, through this up-down driving, turns the pinion 26 engaged with the rack member 51 to rotationally drive the work setting face forming body 7, thus enabling to rotationally drive the work setting face forming body 7 with a simple structure. Furthermore, the work pallet 4 and the table 3 are provided with other oil pressure supply lines for fixing the work and for the clamping mechanism 31, and an oil pressure supply line for the rotational driving mechanism 32 can be constructed easily in supplementation to those lines.

The oil passages 74, 73 for feeding oil pressure to the hydraulic cylinders 52, lo 53 of the rotational driving mechanism 32 are provided with pressure switches 78, 77, and this enables to check completion of the rotation in clockwise direction or counterclockwise direction of the work setting face forming body 7, by detecting pressure increase in the oil passages 74, 73 with the pressure switches 78, 77. Still more, the work setting face forming body 7 is positioned on the pallet main body 6 by engaging two positioning pins 37 with the pin hole 23, and this prevents any displacement when the work setting face forming body 7 is positioned on the pallet main body 6 with the clamping mechanism 31.

Next, descriptions will be made on various modified embodiment. Description will be omitted as to constitutions identical to those of above preferred embodiment.

Figure 5:
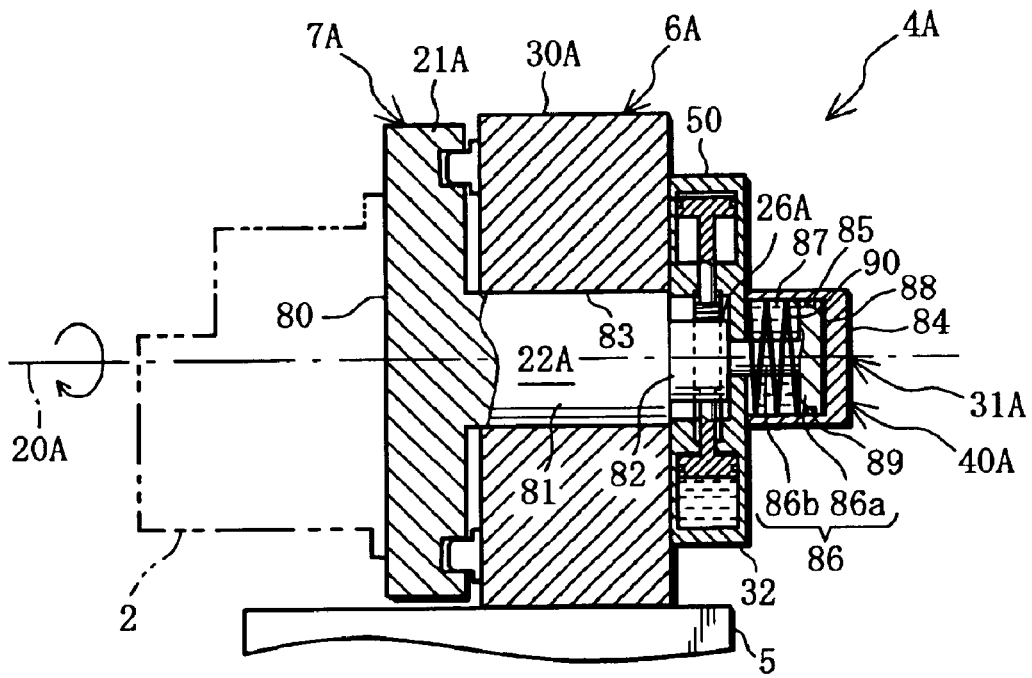
FIG. 5 is a drawing equivalent to FIG. 1 of modified embodiment 1.

1] As shown in FIG. 5, the work pallet 4A comprises a base body 5, a pallet main body 6A fixed to the top face of this base body 5, and a work setting face forming body 7A, provided rotatably around a rotational axis 20A on this pallet main body 6A and having the work setting face 80 for fixing the work 2.

The work setting face forming body 7A is made by integrally forming a disc-shaped work setting plate 21A, and a shaft portion 22A disposed in horizontal posture to the right along the rotational axis 20A on the right face of this work setting plate 21A. On the shaft portion 22A formed are, from the left side, a large-diameter portion 81 and a small-diameter portion 82, and the right end of this small-diameter portion 82 is integrally connected with the piston member 86 of the clamping mechanism 31A. To the small-diameter portion 82 fixed is a pinion 26A having plural teeth at a quarter portion of the outer circumference.

The pallet main body 6A comprises a reference body 30A, a clamping mechanism 31A for releasably fixing the work setting face forming body 7A, and a rotational driving mechanism 32 for rotationally driving the work setting face forming body 7A around the rotational axis 20A.

Near the rotational axis 20A of the reference body 30A formed is a through hole 83, and the large-diameter portion 81 of the work setting face forming body 7A is slidably fitted in this through hole 83.

The hydraulic cylinder 40A of the clamping mechanism 31A is disposed on the right end side of the case body 50 of the rotational driving mechanism 32, and this hydraulic cylinder 40A is constituted with a cylinder body 84, a cylinder hole 85 formed in this cylinder body 84, a piston member 86 provided at the right end of the work setting face forming body 7A, a clamping oil chamber 87 for generating clamping force, and an unclamping oil chamber 88 for generating unclamping force.

The piston member 86 is made by integrally forming a ring-shaped piston 86a and a piston rod 86b extending to the left from the piston 86a. The piston 86a is slidably fitted in the cylinder hole 85, and the piston 86a is provided with a sealing member 89. On the left side of the piston 86a formed is the clamping oil chamber 87, and in this oil chamber 87 housed is a belleville spring 90 for keeping the fixed state of the work setting face forming body 7A in case of leaking of oil pressure. On the right side of the piston 86a also formed is the unclamping oil chamber 88. The rotational driving mechanism 32 is provided on the right end face of the reference body 30A, and has the same structure as that of above preferred embodiment.

Next, descriptions will be made on the operations and advantages of this work pallet 4A.

When fixing the work setting face forming body 7A to the pallet main body 6A, drive the piston member 86 to the right by feeding oil pressure to the clamping oil chamber 87, in the state in which oil pressure is relieved from the unclamping oil chamber 88, and this will make the work setting face forming body 7A move to the right to be fixed to the pallet main body 6A. When releasing the work setting face forming body 7A, relieve oil pressure from the clamping oil chamber 87, and then feed oil pressure to the unclamping oil chamber 88 to drive the piston member 86 to the left against the urging force of the belleville spring 90. As a result, the work setting face forming body 7A moves to the left and is released. The rotation of the work setting face forming body 7A by the rotational driving mechanism 32 is the same as that of above preferred embodiment, and its explanation will be omitted.

According to this work pallet 4A, in which the clamping mechanism 31A is disposed on the right side of the reference body 30A, the structure of the pallet main body 6A can be simplified. This work pallet 4A also has other advantages similar to those of above embodiment.

Figure 6:
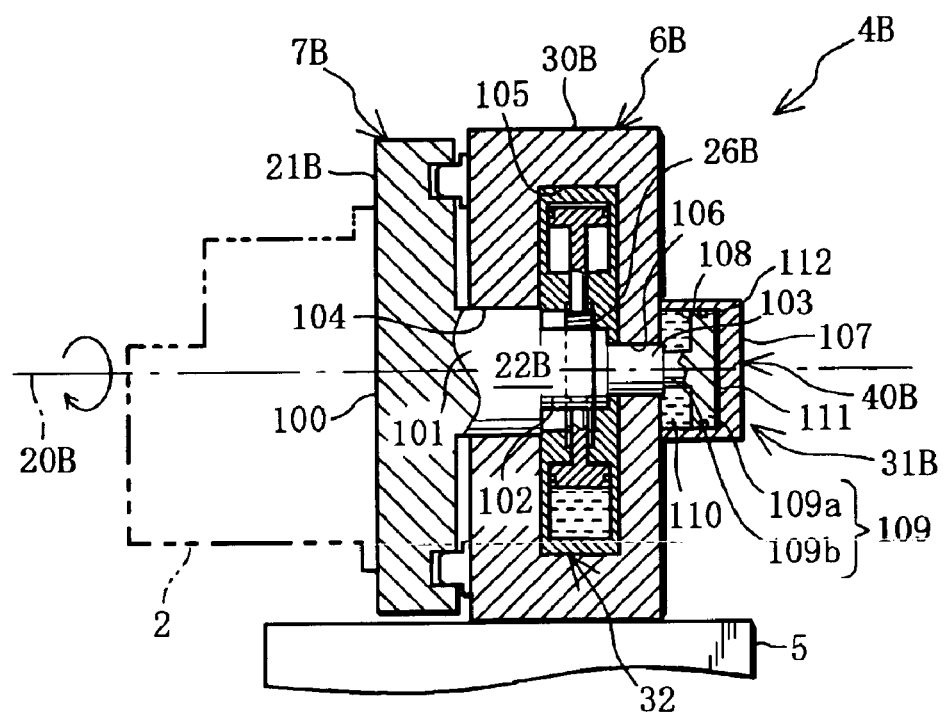
FIG. 6 is a drawing equivalent to FIG. 1 of modified embodiment 2.

2] As shown in FIG. 6, the work pallet 4B comprises a base body 5, a pallet main body 6B fixed to the top face of this base body 5, and a work setting face forming body 7B, provided rotatably around the rotational axis 20B on this pallet main body 6B and having the work setting face 100 for fixing the work 2.

The work setting face forming body 7B is made by integrally forming a disc-shaped work setting plate 21B, and a shaft portion 22B disposed in horizontal posture to the right along the rotational axis 20B from the right end of this work setting plate 21B. On the shaft portion 22B formed are, from the left side, a large-diameter portion 101, a medium-diameter portion 102 and a small-diameter portion 103, and the right end of this small-diameter portion 103 is integrally connected with the piston member 109 of the clamping mechanism 31B. To the medium-diameter portion 102 fixed is a pinion 26B having plural teeth at a quarter portion of the outer circumference.

The pallet main body 6B comprises a reference body 30B, a clamping mechanism 31B for releasably fixing the work setting face forming body 7B, and a rotational driving mechanism 32 for rotationally driving the work setting face forming body 7B around the rotational axis 20B.

Near the rotational axis 20B of the reference body 30B serially provided are, from the left side, storing holes 104, 105, 106, and in these storing holes 104, 106 slidably fitted are the large-diameter portion 101 and the small-diameter portion 103 of the work setting face forming body 7B respectively, while the rotational driving mechanism 32 is disposed in the storing hole 105.

The hydraulic cylinder 40B of the clamping mechanism 31B is disposed on the right end side of the reference body 30B, and this hydraulic cylinder 40B is constituted with a cylinder body 107, a cylinder hole 108 formed in this cylinder body 107, a piston member 109 provided at the right end of the work setting face forming body 7B, a clamping oil chamber 110 for generating clamping force, and an unclamping oil chamber 111 for generating unclamping force.

The piston member 109 is made by integrally forming a ring-shaped piston 109a is slidably fitted in the cylinder hole 108, and the piston 109a is provided with a sealing member 112. On the left side of the piston 109a formed is the clamping oil chamber 110, and on the right side of the piston 109b formed is the unclamping oil chamber 111. The rotational driving mechanism 32 is provided in the reference body 30B, and has the same structure as that of above preferred embodiment.

Explanation will be given on the operations and advantages of this work pallet 4B. When fixing the work setting face forming body 7B to the pallet main body 6B, drive the piston member 109 to the right by feeding oil pressure to the clamping oil chamber 110, in the state in which oil pressure is relieved from the unclamping oil chamber 111, and this will make the work setting face forming body 7B move to the right and be fixed to the pallet main body 6B. When releasing the work setting face forming body 7B, relieve oil pressure from the clamping oil chamber 110, and then feed oil pressure to the unclamping oil chamber 111 to drive the piston member 109 to the left. As a result, the work setting face forming body 7B will move to the left and be released.

The rotation of the work setting face forming body 7B by the rotational driving mechanism 32 is the same as that of above preferred embodiment, and its explanation will be omitted.

According to this work pallet 4B, in which the rotational driving mechanism 32 is disposed in the reference body 30B, the work pallet 4B can be made small in size. This work pallet 4B also has other advantages similar to those of above preferred embodiment.

Figure 7:
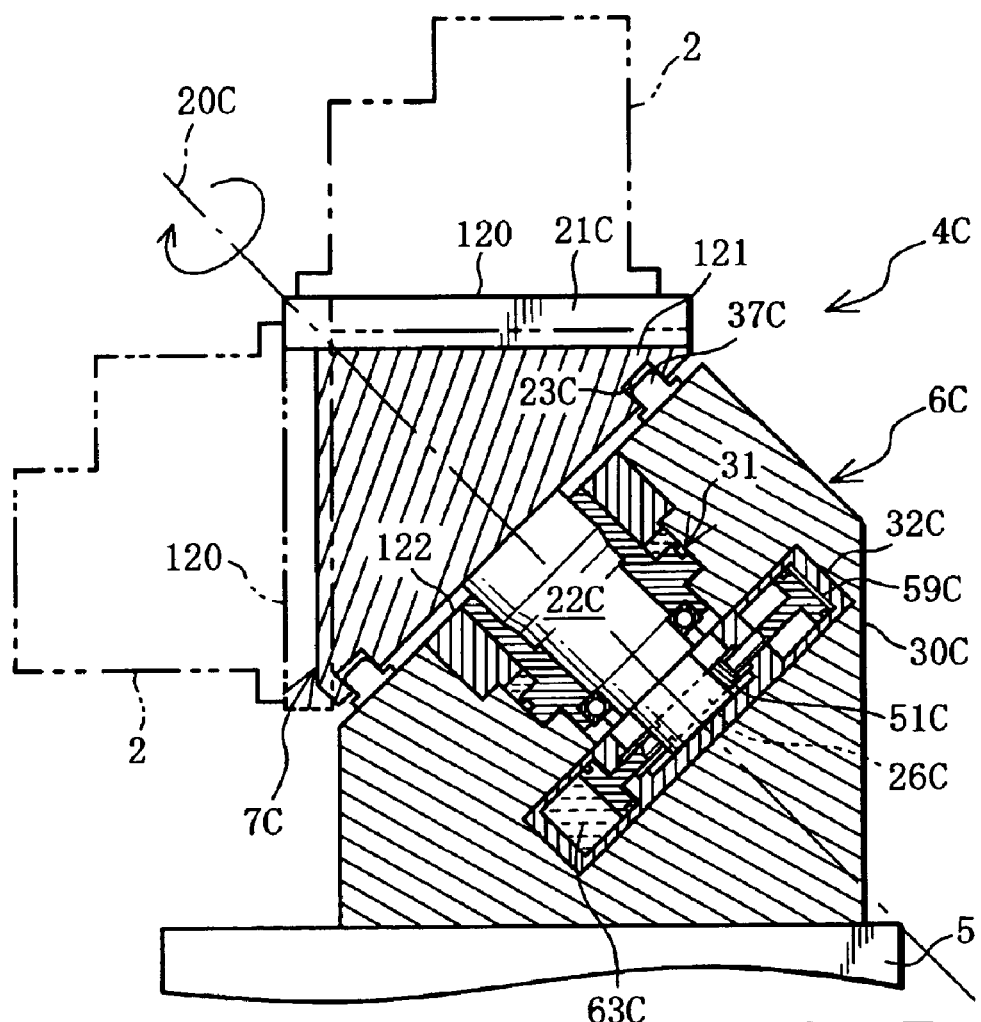
FIG. 7 is a drawing equivalent to FIG. 1 of modified embodiment 3.

3] As shown in FIG. 7, the work pallet 4C comprises a base body 5, a pallet main body 6C fixed to the top face of this base body 5, and a work setting face forming body 7C, provided rotatably around the rotational axis 20C on this pallet main body 6C and the work setting face forming body 7C is provided with the work setting face 120 for fixing the work 2.

The work setting face forming body 7C comprises a work setting member 121 in the shape of a triangle block of right-angled isosceles triangle, a shaft portion 22C disposed in inclined posture inclined by 45° from the horizontal direction in a vertical plane along the rotational axis 20C, and extending from the bottom face (face in which the bottom side of the right-angled isosceles triangle is included) of this work setting member 121. On either face of the side faces (faces in which the isosceles sides of the right-angled isosceles triangle are included) of the work setting member 121 provided is a work setting plate 21C in either vertical posture or horizontal posture, and on the outer face of this work setting plate 21C formed is in either horizontal plane or vertical plane a work setting face 120 for fixing the work 2. On the bottom face of the work setting member 121 formed are four pin holes 23C at four positions on the circumference with the center of the rotational axis 20C.

The pallet main body 6C comprises a reference body 30C, a clamping mechanism 31 for releasably fixing the work setting face forming body 7C, and a rotational driving mechanism 32C for rotationally driving the work setting face forming body 7C around the rotational axis 20C.

The reference body 30C has a sloped face 122 inclined by 45° from the horizontal direction in a vertical plane, and this sloped face 122 is provided with two positioning pins 37C engageable with the pin holes 23C at positions symmetrical to the rotational axis 20C. The clamping mechanism 31 is disposed in the reference body 30C, and has the same structure as that of above preferred embodiment.

The rotational driving mechanism 32C, disposed inside the reference body 30C, has a structure approximately identical to that of above preferred embodiment. In this work pallet 4C, however, it is necessary to turn the work setting face forming body 7C by 180° around the rotational axis 20C, to change the posture of work 2 by 90° in a vertical plane, as shown in FIG. 7 and, for that reason, plural teeth are formed at a half portion of the outer circumference of the pinion 26C provided at the end part of the shaft 22C, and plural teeth are formed on the rack member 51C so as to engage with this pinion 26C.

To turn the work setting face forming body 7C, on this work pallet 4C, feed oil pressure to the oil chamber 63C, in the state in which oil pressure is relieved from the oil chamber 59C, and the rack member 51C will be driven to move upward to the right and, as a result, the pinion 26C turns clockwise (direction of arrow mark in FIG. 7) and the work setting face forming body 7C will turn by 180° in clockwise direction, to change the posture of work 2 by 90° in a vertical plane. Conversely, if oil pressure is fed to the oil chamber 59C in the state in which oil pressure is relieved from the oil chamber 63C, the rack member 51C will be driven to move downward to the left, the pinion 26C will turn counterclockwise, and the work setting face forming body 7C will turn by 180° in counterclockwise direction, with changing the posture of work 2 by 90°. This work pallet 4C also has other advantages identical to those of above embodiment.

Figure 8:
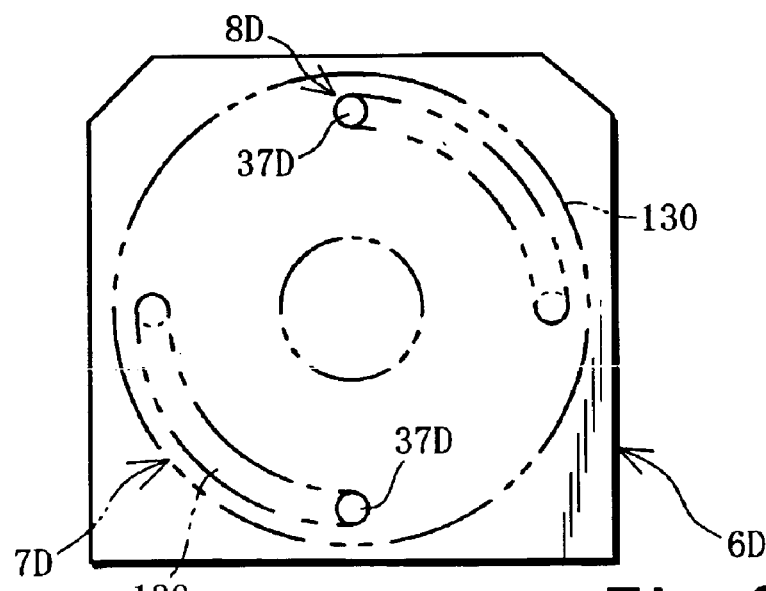
FIG. 8 is a drawing equivalent to FIG. 2 of modified embodiment 4.

4] As shown in FIG. 8, the positioning mechanism 8D may have two positioning pins 37D provided on the pallet main body 6D, and two arched grooves 130 formed on the work setting face forming body 7D and for introducing two positioning pins 37D. In that case, it is possible to turn the work setting face forming body 7D, in the state in which the two positioning pins 37D of the positioning mechanism 8D are engaged with two arched grooves 130 respectively, without releasing the fixing of the work setting face forming body 7D by the forming body 7D, in the state in which the two positioning pins 37D of the positioning mechanism 8D are engaged with two arched grooves 130 respectively, without releasing the fixing of the work setting face forming body 7D by the clamping mechanism 31, and this makes it possible to engage the positioning pins 37D with the end part of the arched grooves 130, when the work setting face forming body 7D turned by 90°, to prevent any further rotation of the work setting face forming body 7D.

5] The positioning mechanism 8 may be constituted in such a way that the work setting face forming body 7 is positioned on the pallet main body 6 by means of three or more positioning pins 37. Moreover, it may be possible to form the outer circumferential face of the positioning pin 37 and the inner circumferential face of the pin hole 23 in tapered face respectively, so that positioning may be made with engagement of those tapered faces. Furthermore, it may also be possible to fit an elastically deformable ring-shaped collet to the outside of the positioning pin 37 for enabling high-accuracy positioning by reducing the diameter of the collet in positioning.

6] Needless to say, the present invention may well be applied to other work pallets which are easily conceivable by those skilled in the art without changing the principle of the present invention.

What is claimed is:

1. A work pallet for detachably fixing a work to be machined with a machine-tool and detachably fixed to a table of the machine-tool, comprising:
    a base body detachably fixed to said table,
    a pallet main body fixed on a top face of said base body, and
    a work setting face forming body, provided rotatably around a rotational axis on said pallet main body and having a work setting face for fixing said work; wherein
    said pallet main body is provided with a hydraulic clamping means for releasably fixing said work setting face forming body, and a hydraulic rotational driving means for rotationally driving said work setting face forming body around said rotational axis;
    further comprising a positioning mechanism for positioning said work setting face forming body on said pallet main body, wherein said positioning mechanism comprises plural positioning pins provided on said pallet main body, and plural arched grooves formed on said work setting face forming body, said plural positioning pins being engageable with said plural arched grooves, respectively.

2. A work pallet according to claim 1, wherein said work setting face of said work setting face forming body is formed on a vertical plane, and said work setting face forming body comprises a rotational shaft portion disposed in horizontal posture.

3. A work pallet according to claim 1, wherein said work setting face of said work setting face forming body is formed on a vertical plane or a horizontal plane, and said rotational shaft portion of said work setting face forming body is disposed in a posture inclined by 45° from a horizontal direction in a vertical plane.

4. A work pallet according to claim 1, wherein said hydraulic rotational driving means is provided with a pinion fixed to a rotational shaft portion of said work setting face forming body, a rack member engaged with said pinion, and one or plural hydraulic cylinders for driving said rack member forward and backward in the longitudinal direction thereof.

* * * * *